M. O'CONNOR.
SPRING WHEEL.
APPLICATION FILED JAN. 11, 1915.
1,166,148.
Patented Dec. 28, 1915.
2 SHEETS—SHEET 1.
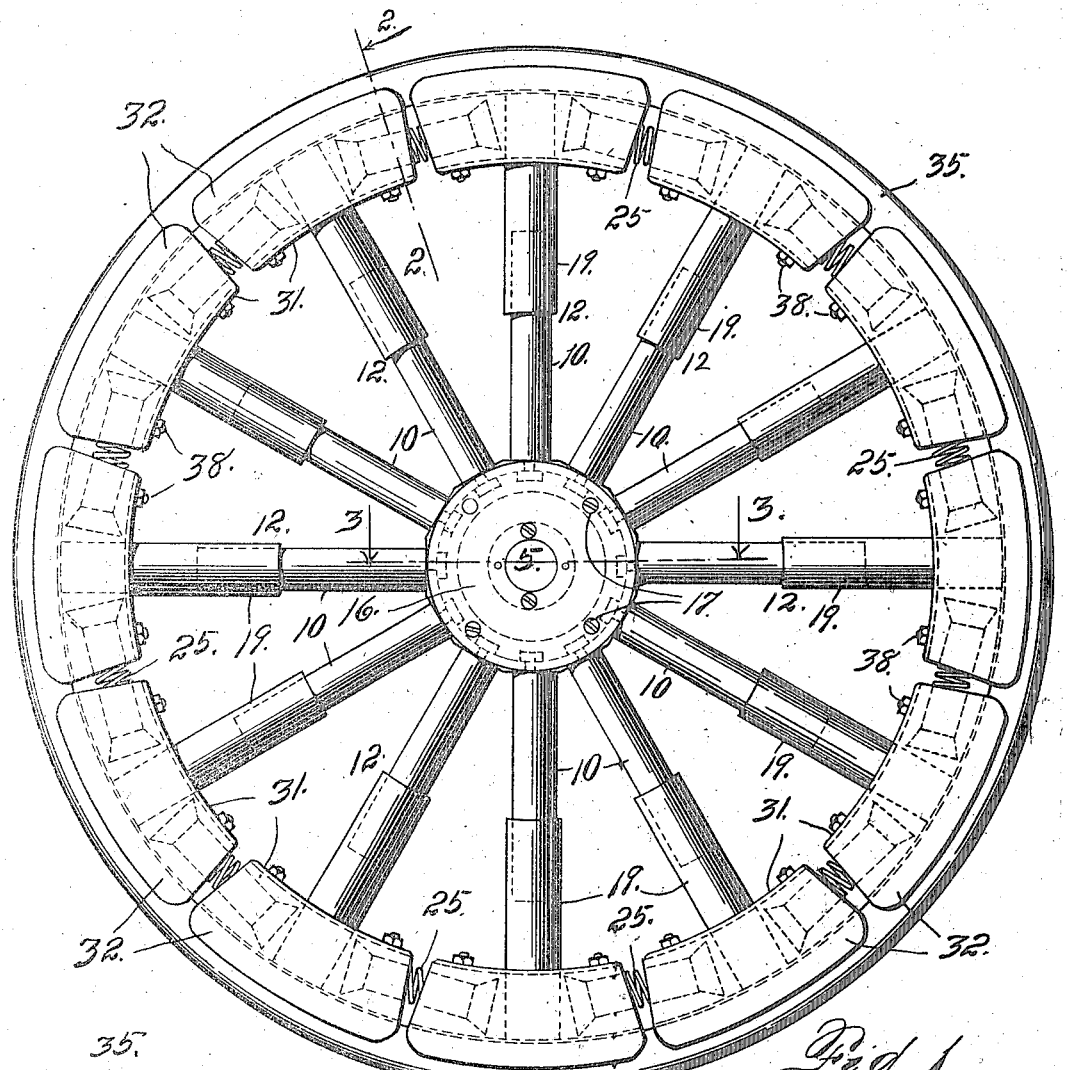
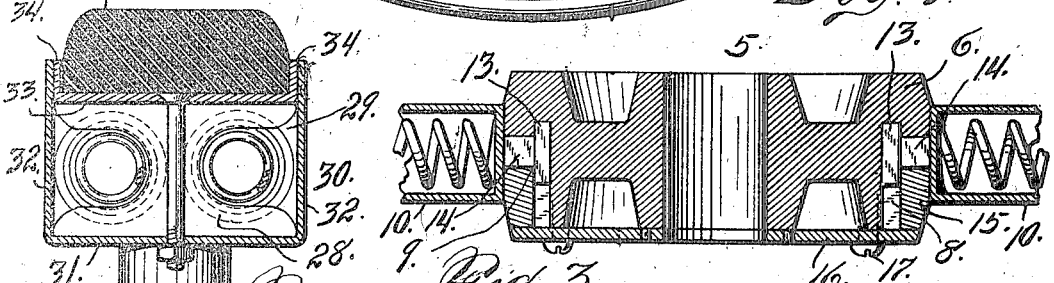
Witnesses
Otto E. Hoddick
John B. Dade.
Inventor
Maurice O'Connor.
By
Attorney

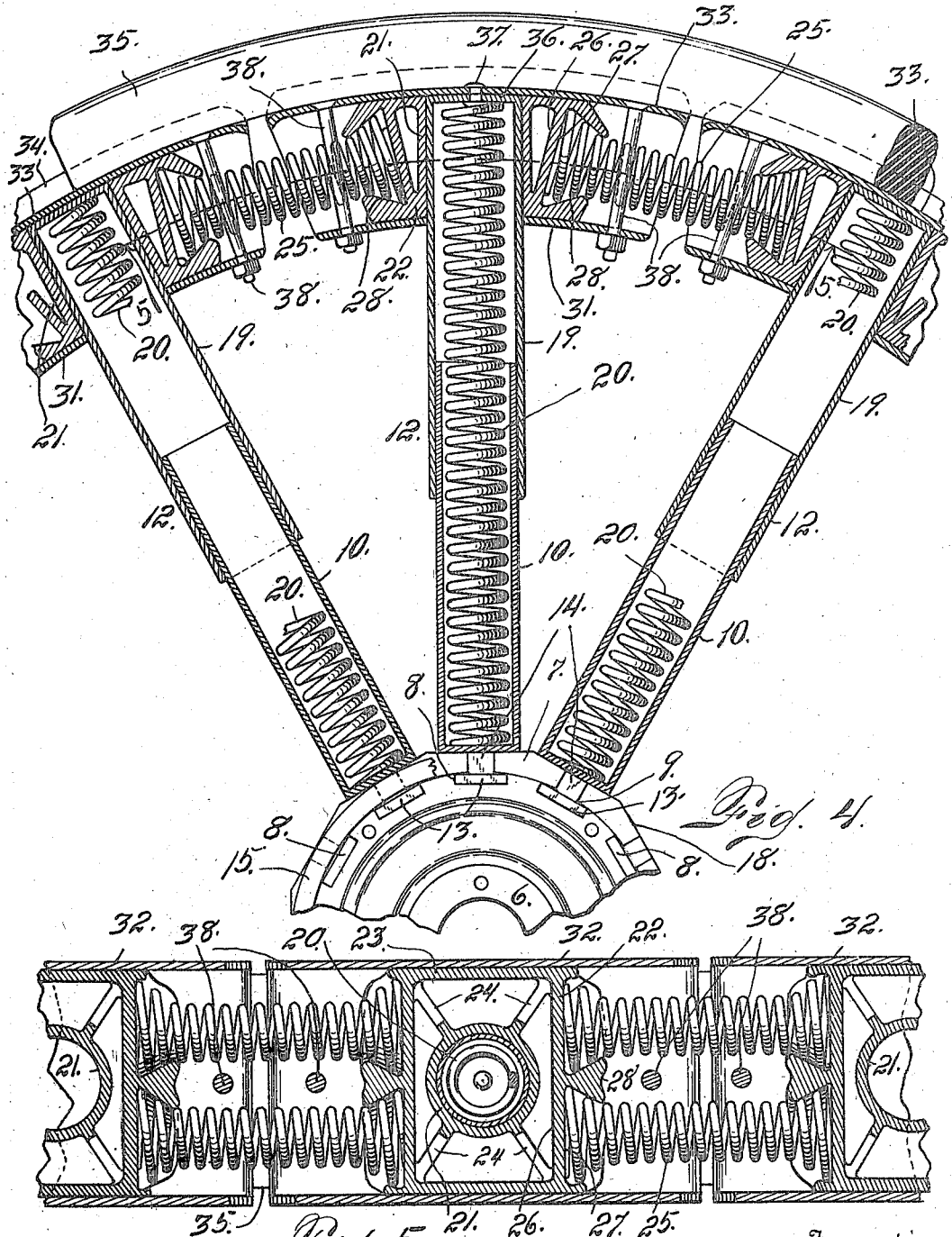

UNITED STATES PATENT OFFICE.

MAURICE O'CONNOR, OF FORT RUSSELL, WYOMING.

SPRING-WHEEL.

1,166,148.   Specification of Letters Patent.   Patented Dec. 28, 1915.

Application filed January 11, 1915.   Serial No. 1,601.

*To all whom it may concern:*

Be it known that I, MAURICE O'CONNOR, a citizen of the United States, residing at Fort Russell, county of Laramie, and State of Wyoming, have invented certain new and useful Improvements in Spring-Wheels; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in spring wheels, my object being to provide a wheel having sufficient yielding capacity, or resilience to make it practicable to employ solid tires as distinguished from the usual pneumatic tires wherever the latter have heretofore been used. Wheels of this character will be more valuable especially in connection with automobiles, motor trucks and other heavy vehicles, since pneumatic tires are highly objectionable for these uses as they are easily punctured and their life is comparatively short, while their cost is exceedingly high. In my improvement, two sets of springs are employed. One set may be termed the spoke springs and the other set the rim springs, the latter being disposed in the direction of the wheel's circumference, while the spoke springs are radially arranged and incased in telescoping tubes, one member of each of these tubes being connected with the rim of the wheel and the other with the hub. The inner tube of each spoke is detachably connected with the hub by introducing a T-shaped head in a slot and groove formed in one side of the hub, these tubes being secured in place by a ring inserted in the groove after the tubular spoke members are all in place. The outer face of the hub is polygonal in shape, having as many sides as there are spokes. The inner extremity of each tube engages the adjacent face of the hub. The outer tube of each spoke is inserted at its outer extremity in a rim section which extends on opposite sides of the tube and forms seats for the rim springs. These springs are located between the outer extremities of the spokes and engage seats formed in the said rim members. Each of these spring-seating members is inclosed in a casing consisting of a U-shaped part having its closed side innermost and which fits around the outer tube, its closed side bearing against the spring-seating section of the rim, while a channel part or member fits into the open extremity of the U-shaped part and has its open side outermost to receive the tire, the U-shaped portion of the channel part forming the casing for the spring seating sections of the rim, being securely connected by bolts. From this it will be understood that the rim of my improved spring wheel is composed of a series of members, there being one member for each spoke, each of these members being composed of three parts, namely, the spring-seating part, the inner U-shaped part and the outer channel part. These members are spaced in the direction of the circumference of the wheel, whereby the rim members are permitted to move independently of each other, the rim springs yielding sufficiently for the purpose, while the spoke springs are compressed in the direction of their axes.

Having briefly outlined my improved construction, I will proceed to describe the same in detail, reference being made to the accompanying drawing, in which is illustrated an embodiment thereof.

In this drawing,—Figure 1 is a side elevation of my improved spring wheel. Fig. 2 is a cross section taken through the rim of the wheel on the line 2—2, Fig. 1, the parts being shown on a larger scale. Fig. 3 is a section taken through the hub, cutting two of the hollow spokes which are partly broken away. This section is taken on the line 3—3, of Fig. 1, the parts being shown on a larger scale. Fig. 4 is a fragmentary sectional view of the wheel, illustrating a number of spokes, and portions of the rim and hub with which they are connected, the parts being shown on a larger scale than in Fig. 1. Fig. 5 is a section taken through the rim in the direction of the circumference of the wheel on the line 5—5, Fig. 4, looking outwardly, or in the direction of the arrows at the extremities of this line.

The same reference characters indicate the same parts in all the views.

Let the numeral 5 designate the hub of the wheel which as illustrated in the drawing, consists of a body member 6 which is circumferentially cut away on one side, as shown at 7 and also provided with a series of relatively short slots 8, extending inwardly from the circular groove 7. This groove and the slots are provided to permit the insertion of the inner T-extremities 9 of the inner hollow or tubular members 10 of the spokes 12. The head 13 of each of these T-extremities enters one of the slots 8, while the neck of stem 14 passes through the groove 7. These spoke members are secured in place by applying a ring 15 to the hub, the same being fitted into the groove 7 and closely engaging the stems 14 of the T-extremities just outside of the heads 13. The ring is held in place by a disk 16 applied to the side of the hub where the ring 15 is located, the disk covering the ring, closing the slots 8 and being secured in place by screws 17, or other suitable fastening devices. The outer edge of the hub is centrally provided with a number of flat faces 18 against which are respectively seated the inner members 10 of the spokes. These inner members of the spokes coöperate with outer telescoping tubular members 19 to form the spokes 12, the two tubes of each spoke being free to move radially or in the direction of the spoke's axis, the tubular spoke in each case incasing a spiral spring 20, whose opposite extremities are seated against the closed extremities of the tubular spoke members. The outer end of each spoke member 19 enters and fits closely into a sleeve 21, forming a part of a rim section 22, the sleeve being connected with the outer rectangular portion 23 of the section by means of diagonally arranged webs 24, which extend from the sleeve to the corners of the part 23, which is rectangular when viewed in a radial direction (see Fig. 5). Each of these rim sections 22 is provided on its opposite sides 26 with seats for springs 25, each side 26 having two seats which are designated 27. These seats are formed of flanges 28 which are open on one side as shown at 29 (see Fig. 2) to receive the enlarged extremities of the springs 25, the convolutions of the latter being of greater diameter at their extremities, the flanged seats being formed of counterpart shape, whereby the springs are held securely in place. As all of these rim sections 22 are substantially identical in construction, a description of one will suffice for all. The sleeves 21 of these spring-seating sections 22 receive the outer ends of the tubes 19. These sleeves 21 however, are open at both ends, but it is necessary that their outer ends shall be closed in order to form seats for the outer closed extremities of the tubes 19. Hence, each rim section 22 is held in place by a U-shaped member 30 having its inner side closed as shown at 31, while its opposite sides 32 are arranged on opposite sides of the rim section 22 whereby the U-shaped member secures the rim section in place on the inside and on two opposite sides. On the outside the rim section is engaged by the inner flat wall 33 of a channel member having relatively short outwardly projecting flanges 34 which enter the U-shaped member, the flanges 34 fitting closely between the outer portions of the walls 32, the said flanges being arranged to receive the tire 35 of the wheel. As there is one of these channel members for each spoke, the series of channel members form the seat for the tire. From this it will be understood that the wall 33 of the channel member and the wall or side 31 of the corresponding U-shaped member, coöperate to maintain the rim section 22 in place on the outside and the inside of the rim, while the walls 32 of the U-shaped member embrace this section on the two vertical sides. When the tube 19 is in place and the parts of the wheel are assembled, the outer closed extremity 36 of the tube is secured to the inner wall 33 of the channel member by means of a rivet 37, or in any other suitable or desirable manner. The channel member and the U-shaped member are securely connected in coöperative relation with the rim section 22 by means of radially disposed bolts 38 which are disposed between the adjacent portions of the springs 25, whose extremities engage the seats formed on the sides 26 of the rim section, as heretofore explained, there being one bolt on each side of the said rim section, the same being centrally located, as best illustrated in Fig. 5.

As illustrated in the drawing, the wheel is composed of twelve spokes, though any other suitable or desirable number may be employed. It will be understood, however, that the detailed description heretofore given of a single spoke and its connection, together with the manner of securing the spoke at its outer and inner extremities, is precisely the same in each case. Hence, the detailed description of the mechanism of a single spoke is sufficient for all.

From the foregoing description, the use and operation of my improved spring wheel will be readily understood, and need not be explained further in detail.

Having thus described my invention, what I claim is,—

1. A spring wheel whose rim is composed of a series of spring-spaced members respectively secured to the outer extremities of the spokes, each member consisting of a rim section which receives the outer extremity of the corresponding spoke, and inner and outer parts incasing the rim section.

2. A spring wheel whose rim is composed of a series of spring-spaced members respectively secured to the outer extremities of the spokes, each member consisting of a rim section which receives the outer extremity of the corresponding spoke, an inner U-shaped part and an outer channel part fitted into the U-shaped part, the two parts engaging and being spaced by the said rim section.

3. A spring wheel whose rim is composed of a series of spring-spaced members respectively secured to the outer extremities of the spokes, each member consisting of a rim section which receives the outer extremity of the corresponding spoke, an inner U-shaped part and an outer channel part fitted into the U-shaped part, the two parts engaging and being spaced by the said rim section, the channel parts of the rim members having their flanges turned outwardly to receive the tire of the wheel.

4. In a spring wheel, the combination with a hub, of a rim, composed of a series of members spring spaced in the direction of the circumference of the wheel, and spokes each composed of telescoping tubes and a spiral spring incased thereby, the outer tubular members of the spokes being secured to the respective rim members, the inner extremities of the tubular spoke members being detachably secured to the hub.

5. In a spring wheel, the combination with a hub, of a rim composed of a series of members spring spaced in the direction of the circumference of the wheel, spokes each composed of telescoping tubes and a spiral spring incased thereby, the outer tubular members of the spokes being secured to the respective rim members, the inner extremities of the tubular spoke members being each T-shaped and the hub being slotted to receive the heads of the T-ends and circumferentially grooved to receive the stems of the T-shaped extremities, and a ring inserted in the groove of the hub and suitably secured in place, substantially as described.

In testimony whereof I affix my signature in presence of two witnesses.

MAURICE O'CONNOR.

Witnesses:
  NELLIE E. EVANS,
  S. S. PEARLSTINE.

Copies of this patent may be obtained for five cents each, by addressing the "Commissioner of Patents, Washington, D. C."